Sept. 18, 1928.
G. A. ILER
1,684,768
LIVE LINE TESTING DEVICE
Original Filed Nov. 4, 1924
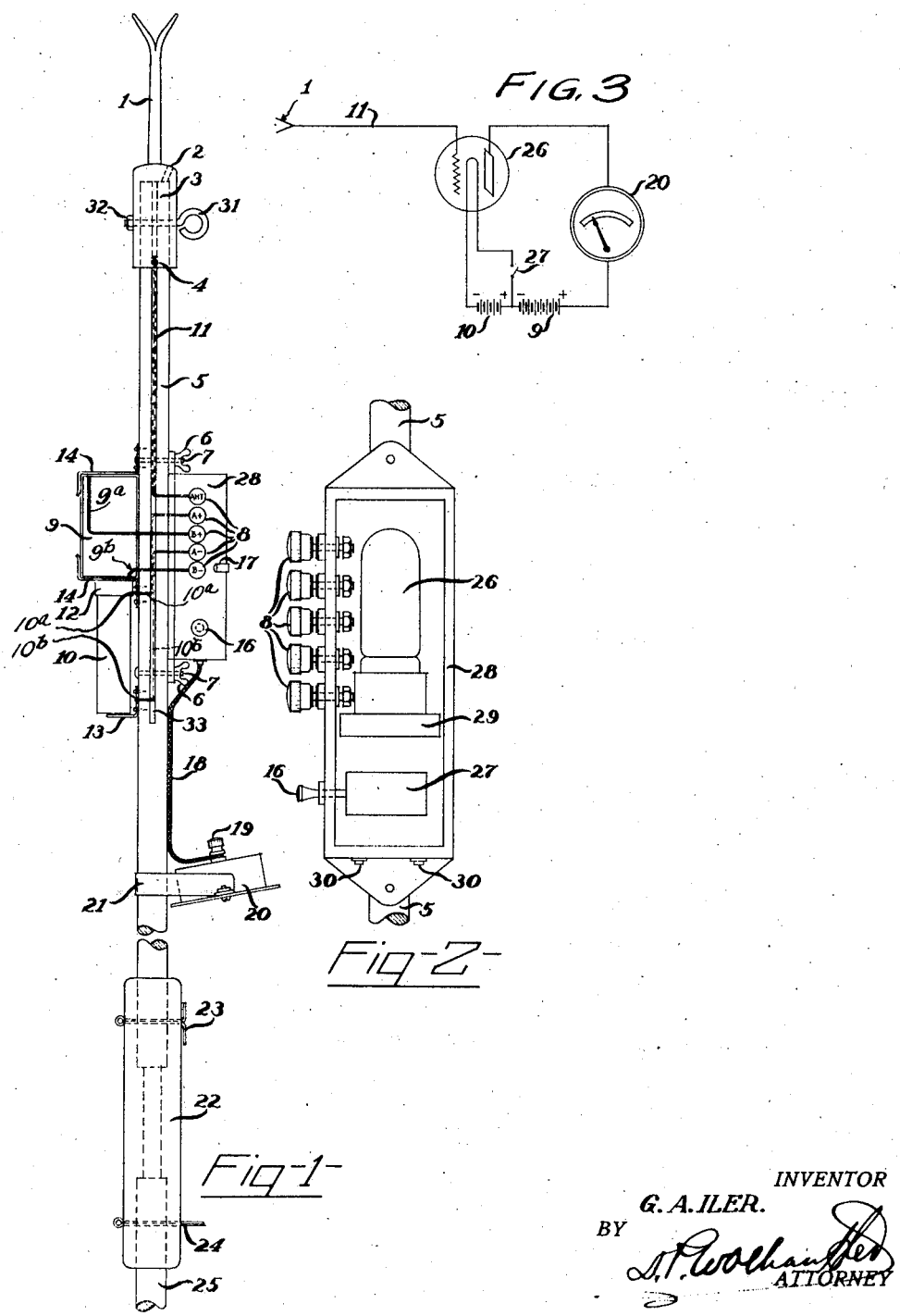
INVENTOR
G. A. ILER.
BY
ATTORNEY Patented Sept. 18, 1928.

1,684,768

UNITED STATES PATENT OFFICE.

GEORGE ARTHUR ILER, OF CLEVELAND, OHIO.

LIVE-LINE-TESTING DEVICE.

Application filed November 4, 1924, Serial No. 747,839. Renewed February 14, 1928.

This invention relates to electrical testing devices and the method of using the same, and more particularly to devices for use in detecting defective units of suspension type insulators, and pin type insulators under actual service conditions, also locating defects in overhead and underground cables; also in manufacturing plants during the process of manufacture, also in locating defects in switchboard panels, electrical defects in street lighting appliances, also in transformer windings, transformer bushings, switch bushings, and to detect electrical sparks resulting from any kind of defective electrical apparatus, or from commutator brushes, or sparks resulting from either static leaks or power leaks in the windings of electrical apparatus, either while running under load or at rest under voltage.

In the methods of testing for defective insulators on high tension transmission lines used heretofore, it has been necessary to shut down the line during the testing operation, which is troublesome and expensive, or else to short-circuit the connecting ends of each unit of the string of insulators successively, or to use the charging current from the hardware of each porcelain unit or the charging current to or across the cement or other binding material between successive porcelain units while the insulators are subject to any potential, and by using an audible signal created by a noise from a small spark some distance away, on the testing stick, with a possibility always of injuring the operator or causing a short-circuit which would knock out the line, causing a serious interruption to service. In this latter method, the danger of knocking out the line, due to short-circuiting the only remaining good unit of a string, is so great that the preliminary testing of each unit must take place in the effort to discover whether or not it is advisable to actually test the string for defective units. Even such preliminary test is not a sure guide, and it is necessary for the operator to be particularly skilled in the art of testing to be able to obtain any information from the preliminary test. And, if the preliminary test discloses the fact that there is probably but one good unit left in the string, in order to prevent injury to the line and possible injury to the operator, it is advisable not to test the string, at least under service conditions, but to wait until the power is cut off the line for some reason, when the suspected defective string is replaced by a good string and the units of the defective string tested in the laboratory. Again, it is necessary to test the units of the strings in predetermined order, to prevent the possibility of knocking out the line and injuring the operator.

In the use of another device that overcomes some of the above difficulties, it is necessary for the operator using the testing device to have an extremely sensitive hearing and be able to hear the noise from the spark jumping across a minute gap in the circuit and the operator is compelled to hear this very faint noise through a long rubber tube, and with his ears completely covered with a device to which is connected this tube in order to exclude outside noises. Since it is impossible to exclude all outside noises in this way, it becomes extremely difficult to make such tests when there are such noises as passing trains or automobiles, or the wind blowing through the steel towers through the lines nearby. Then again, with other devices, it is impossible to get a spark that is loud enough to be heard, even though the operator's ear should be 12" from the live line, especially when the line is over-insulated as is customary in modern practice, this for the reason that the potential gradient or drop across each unit is not sufficient to cause an audible spark, therefore the testing of such insulators must be abandoned entirely, there being no device that will properly test them while alive and in service. My present invention obviates the objections noted above, and enables me to test for defective units of strings of insulators on pin-type insulators or strain units while they are in position and the lines operating under load conditions, and also to test the units in any desired order.

My invention obviates the objects noted above in that it is an absolutely open circuit method of testing, as this term is generally understood, and the connecting ends of the units are not short circuited at any time during the test, and my invention measures the potential from each part of the insulating units to ground rather than the potential drop across the units, thereby giving a more accurate indication of the condition of the insulator since the insulator is really intended to insulate the line from the ground instead of insulating the line from the next unit.

My invention also obviates the above noted difficulties of hearing the spark, since the signals are amplified nearly 400 times by the special device, and there is a visible reading indicated on the special voltmeter, which makes it possible for several different operators to secure the same reading accurately, regardless of their hearing, or of surrounding noises, thereby making it possible to make a quantitive analysis of the insulation values of the insulator, something that has never been possible heretofore except in the laboratory, under laboratory conditions, which are far from desirable, since these tests vary greatly from those that are made under actual working conditions on a line which has numerous different kinds of high voltage disturbances that are never produced artificially during a laboratory test of insulators.

Heretofore, in testing apparatus, as at present in use, a serious defect is that the operator is liable to injury from the high tension currents as the terminals or testing points of the testing devices have been virtually the ends of a conductor which is in the testing operation, completely short-circuited the insulator units, or depend upon a condenser in series with this circuit to normally prevent a short-circuit, which condenser is liable to break down and still cause a short-circuit and serious trouble. I have remedied this difficulty, and have also constructed a testing device which may be used safely under all working conditions, by only using one contact point, thereby making it impossible to touch the live apparatus at more than one place at a time, also making it impossible to short-circuit anything.

Another object of my invention, therefore, is the provision of an improved apparatus for safely testing units of electrical insulators and of electrical devices as enumerated above, while in actual service.

In the accompanying drawings, illustrating the preferred embodiments of my improved testing apparatus, Figure 1 is a side elevation of the complete live line testing stick, ready to work at testing insulators, bushings and coils.

Figure 2 is an enlarged elevation of all of the apparatus inside the cover.

Figure 3 is a diagram showing the wiring connections of the testing apparatus, using a triode vacuum tube which may be of either the two element, three element or four element tube, using the usual connections to such various tubes.

Similar reference characters designate corresponding parts throughout the several figures of the drawings.

For the purpose of generally explaining the invention it may be pointed out that the apparatus may be conveniently connected to the amplifying device including a vacuum tube of the radiotron type such as is in general use at present for numerous purposes, and thereby make such tests produce a printed record on a graphic instrument on a moving strip of paper.

It may also be connected to any ordinary inductance or capacitance with a variable inductance and capacitance in order to tune in any particular spark or electrical disturbance that is being hunted for or investigated.

By referring to the accompanying drawings it will be observed from Fig. 1 that the present device includes in its organization a specially treated wood handle or stick 5 carrying at one end a metal prong 1 having at one end a metal cap or socket member 3 for fitting over the end of the stick 5 and having therein a hole 2 adapted to receive a paint brush or the like to facilitate marking the defective units while they are alive, by using the stick instead of the hands.

The end of the stick 5 opposite the prong 1 may be provided with a special high-insulation unit 22 made of bakelite and provided with sockets to receive one end of the stick 5 and also a handle member 25 thereby to increase the safety of the stick when being used on high voltage. Cotter pins 23 and 24 may be used to hold the special insulating section in place.

The body of the wood stick 5 may be provided with a long groove 33 for receiving the wire 11 which is electrically connected with the metal cap 3 and prong 1 by means of the coupling or connection 4. This wire 11 leads to one of the terminals marked "Ant" for antenna of the apparatus box 28. This box is fastened to the stick 5 by means of the wing nuts and bolts 6 and 7, and carries on one of the outside faces thereof a plurality of binding posts 8 respectively for making the connections indicated by the symbols "A+", "B+" and "A—" and "B—". Within the box 28 there is provided a socket 29 for holding a vacuum tube 26 which may be an ordinary radio tube of either two elements, three elements, or four elements as in present day use with radio apparatus. Also, the box is provided with a switch device 27 of suitable construction, the same having an exterior operating handle 16.

The lower end of the box is provided with contacts 30 constituting terminals of line wires included in the cable 18, and which lead to the binding post 19 of the voltmeter or other instrument 20 which is held on the stick by means of the metal support or bracket 21.

On the body of the stick 5, adjacent the box 28, there is mounted a 22½ volt "B" battery 9 and a 3 volt "A" battery 10, such as commonly used in radio work. The "B" battery 9 is fastened to the stick 5 by the metal clip 14, and the said "B" battery is connected to terminal "B+" by means of the wire 9ª, and to terminal "B—" by wire 9ᵇ.

The "A" battery 10 is held in position by means of the clips 12 and 13 which also constitute contacts which are respectively connected with the wires 10ª leading to the binding post marked "A+" and the wire 10ᵇ leading to the binding post marked "A—".

The metallic cap 3 may be held on the stick by any suitable or convenient means, as for example, by the eye 31 and nut 32, the said eye 31 constituting means for attaching a hand line to the stick for hoisting it up on wooden poles or steel towers following the testing operators ascension.

By reference to the diagram of Fig. 3 it will be observed that the prong 1 and wire 11 connect with the grid of the vacuum tube 26 while the "A" battery connects, as usual, with the filament of the tube, the said line including the "A" battery 10 and filament having therein the switch 27. The "B" battery 9 is coupled with the "A" battery 10 and is connected to one of the terminals of the instrument 20 by one of the wires in the cable 18 while the other terminal of the instrument 20 is connected to the plate of the radio tube through the other wire in the cable 18.

In making an actual test on insulator, coils or any defective electrical apparatus, while alive, it is only necessary to make the testing apparatus alive by turning on the switch 27 and then by applying the pointer and a reading will be noted on the instrument 20, which will be a direct indication of the potential between that part in contact with the pointer on the end of the stick and earth potential. This reading will be constant and will be in proportion to the insulating strength at that particular point, depending of course upon the thickness of the insulating material, whether it is cracked or dirty or porous or damp, etc. By making these similar tests, at various points over the insulated apparatus, very safe, quick and accurate tests can be made of its electrical condition. In testing insulators, one unit at a time is tested and by progressing over all the other units, the potential gradient is very accurately determined, which in turn is a true indication of its physical condition.

I claim:—

1. A testing device for electrical faults comprising a support carrying a metal contact element, and an electrical measuring device carried by said support and having an antenna terminal connected with said contact element, said device also including a triode vacuum tube, sources of electrical energy and a voltmeter, the device being free from a ground connection.

2. A testing device for electrical faults comprising a portable insulated support carrying a metal contact point, an electrical measuring device carried by said support and including a triode amplifying tube and batteries, a volt meter, a circuit wire connection between the grid of the lamp and the contact point, a circuit connection between one source of electrical energy and the lamp filament and a circuit connection including another source of electrical energy, the voltmeter, and the plate element of the lamp.

3. A testing device for electrical faults, said device being free from a ground connection and comprising a portable insulated support carrying a metallic contact element, an electrical measuring device carried by said support and including an antenna connected to said contact element, a triode vacuum tube having the grid thereof connected with the antenna, and an indicating device included in the plate circuit of said tube.

4. A testing device for electrical faults, said device being free from a ground connection and comprising a support carrying a metallic contact element, an electrical measuring device carried by the support and including an antenna connected with the contact point, a triode tube having the grid thereof connected with the antenna, a source of current for the filament, a source of current for the plate, and a voltmeter included in the plate circuit whereby alternating current impulses impressed on the grid will be registered in the plate circuit.

5. A testing device for electrical faults, said device being free from a ground connection and comprising a support carrying a metal contact element, a triode vacuum tube having the grid thereof connected with the contact element, sources of electrical energy carried by the support respectively for the filament and plate element of said tube, and an electrical registering device included in the plate circuit.

In testimony whereof I hereunto affix my signature.

GEORGE ARTHUR ILER.